United States Patent
Gottlieb et al.

(10) Patent No.: US 10,661,213 B2
(45) Date of Patent: May 26, 2020

(54) INDUSTRIAL AIR FILTRATION SYSTEM AND ASSOCIATED FILTER ELEMENT

(71) Applicants: Greg M. Gottlieb, Cincinnati, OH (US); Jeff Allen Canfield, Belton, MO (US)

(72) Inventors: Greg M. Gottlieb, Cincinnati, OH (US); Jeff Allen Canfield, Belton, MO (US)

(73) Assignee: United Air Specialists, Inc., Cincinnati, OH (US)

(*) Notice: Subject to any disclaimer, the term of this patent is extended or adjusted under 35 U.S.C. 154(b) by 253 days.

(21) Appl. No.: 15/604,241

(22) Filed: May 24, 2017

(65) Prior Publication Data
US 2018/0339255 A1    Nov. 29, 2018

(51) Int. Cl.
*B01D 46/00* (2006.01)
*B01D 46/24* (2006.01)
*B01D 46/42* (2006.01)

(52) U.S. Cl.
CPC ....... *B01D 46/0031* (2013.01); *B01D 46/002* (2013.01); *B01D 46/4227* (2013.01); *B01D 46/2411* (2013.01)

(58) Field of Classification Search
CPC .............. B01D 46/003; B01D 46/0031; B01D 46/002; B01D 46/2411; B01D 46/2414; B01D 46/0005
See application file for complete search history.

(56) References Cited

U.S. PATENT DOCUMENTS

| | | | |
|---|---|---|---|
| 5,803,941 A * | 9/1998 | Berkhoel | B01D 46/0004 55/498 |
| 5,827,430 A | 10/1998 | Perry, Jr. et al. | |
| 5,893,956 A | 4/1999 | Perry, Jr. et al. | |
| 2005/0235617 A1* | 10/2005 | Read | B01D 46/0005 55/423 |

FOREIGN PATENT DOCUMENTS

| | | |
|---|---|---|
| CN | 105605690 A | 5/2016 |
| EP | 1970114 A2 | 9/2008 |
| KR | 1020090123652 A | 12/2009 |
| KR | 1020130090308 A | 8/2013 |
| KR | 101416563 B1 | 7/2014 |

* cited by examiner

*Primary Examiner* — Robert Clemente
(74) *Attorney, Agent, or Firm* — Reinhart Boerner Van Deuren P.C.

(57) ABSTRACT

An industrial air filtration system and associated filter element are provided. The system includes a filter cage which supports its associated filter element or elements. The filter element or elements seal directly against upper and lower plates of the filter cage. Further, the system includes a liquid collection region and a sump region in fluid communication with the liquid collection region. The aforementioned regions are arranged to drain away liquid which coalesces within the system during operation.

15 Claims, 10 Drawing Sheets

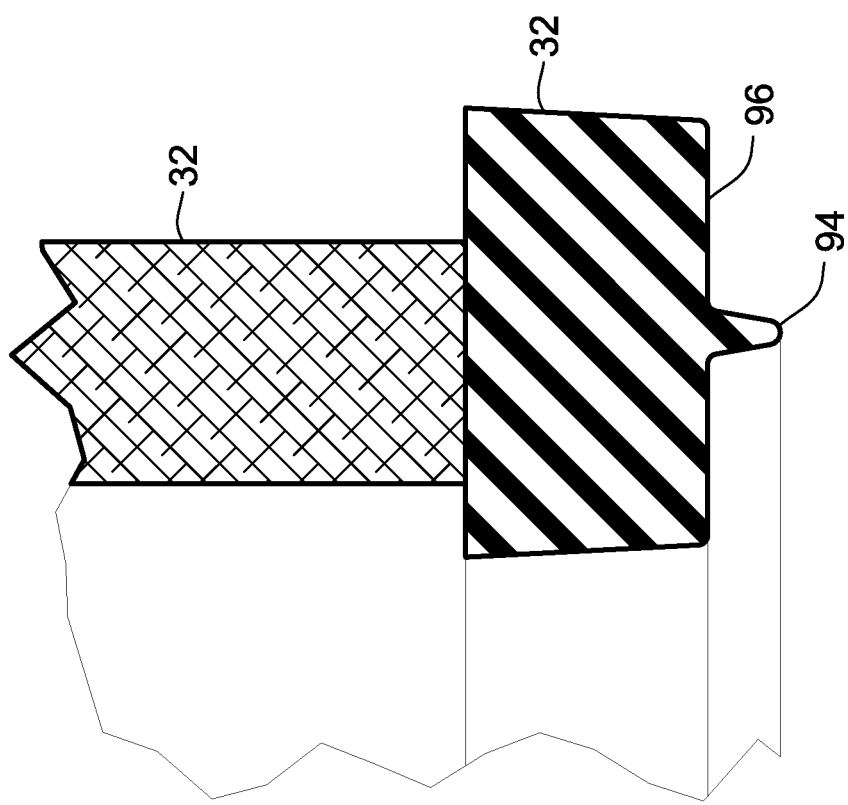

INDUSTRIAL AIR FILTRATION SYSTEM AND ASSOCIATED FILTER ELEMENT

FIELD OF THE INVENTION

This invention generally relates to air filtration, and more particularly, to industrial air filtration systems and their associated filter elements.

BACKGROUND OF THE INVENTION

Many industrial processes result in the creation of fine particulates and/or aerosols, and their dispersion in to the immediate environment. This dispersion may negatively affect air quality in the area. As such, industrial air filtration systems are typically employed to clean the air. Such filtration systems typically employ a one or more coalescing filters that collect small particles and/or liquid droplets carried by a fluid stream, such as an air flow. When liquid droplets are collected, they will generally combine into larger droplets. Often, the combined droplets become heavy enough to flow downward under the pull of gravity, thereby draining out of the bottom of the filter for collection or drainage. Solid particulates may become trapped in the media of the filter elements. As such, the industrial air filtration system on the one hand removes solids from the air stream, while on the other hand, also removes unwanted liquids from the air stream as well.

Unfortunately, contemporary industrial air filtration systems are not without their own drawbacks. Typically, the filter elements are contained within a cabinet and seal against a sheet which separates the cabinet into a clean air side and a dirty air side. Air must first flow through the media of the filter elements to reach the clean air side. Sealing the filter elements against the sheet, however, typically requires specific complex structures such as compression devices, camming mechanisms, tool operated mechanisms, etc., to ensure that the filter elements seal properly against the sheets. Further, the filter elements themselves typically have an open end cap at one end, and a closed end cap at the other end. The end caps thus have separate and distinct geometries, each which require a separate and distinct manufacturing process to form. Such a design is also problematic as it requires orienting the filter elements in the correct direction during installation. Put differently, there is a risk with such designs that the filter elements can be installed in the opposite orientation which may prevent filtration entirely. Still further, with a closed end cap, liquid entrapped in the media during filtration must wick back to the outer surface of the media. This can lead to an undesirable reduction in effective filtration area.

Accordingly, there is a need in the art for an air filtration system and associated filter element which overcome the above drawbacks. The invention provides such a filtration system and associated filter element. These and other advantages of the invention, as well as additional inventive features, will be apparent from the description of the invention provided herein.

BRIEF SUMMARY OF THE INVENTION

In one aspect, an industrial air filtration system for filtering an air stream is provided. An embodiment of such a system includes a housing having at least one inlet and at least one outlet with a flowpath extending between the at least one inlet and the at least one outlet. A filter cage is mounted within the housing. The filter cage has an upper plate and a lower plate in opposed spaced relation. At least one filter element is mounted to the filter cage. A liquid collection region is formed adjacent a first side of the lower plate. The liquid collection region is arranged to collect liquid removed from the air stream. A sump region formed adjacent a second side of the lower plate, the second side opposite the first side. The liquid collection region and sump region are in fluid communication with one another via at least one weep orifice.

In an embodiment, a plurality of vertical supports are connected to and separate the upper and lower plates. Each of the upper and lower plates include at least one aperture.

In an embodiment, the at least one filter element includes a ring of filter media having a first axial end and a second axial end. A first end cap is affixed to the first axial end. A second end cap is affixed to the second axial end. The first end cap has an opening which aligns with the at least one aperture of the upper plate, and wherein the second end cap has an opening which aligns with the at least one aperture of the lower plate. The opening of the first end cap is an air outlet of the at least one filter element, and wherein the opening of the second end cap is a drain of the at least one filter element.

In an embodiment, the liquid collection region is defined by a channel formed between the lower plate and the housing. The channel has a length which is at least half of a length of the lower plate.

In an embodiment, the at least one weep orifice includes a plurality of weep orifices intermittently spaced along the length of the channel. Each weep orifice of the plurality of weep orifices has a rectangular periphery.

In an embodiment, the sump region is defined by an interior space between the lower plate and the housing. The system can also include a drain port in communication with the sump region. The drain port is situated above a maximum height of the at least one weep orifice.

In another aspect, an industrial air filtration system for filtering an air stream is provided. An embodiment of such a system includes a housing having at least one inlet and at least one outlet with a flow path extending between the at least one inlet and the at least one outlet. A filter cage is mounted within the housing. The filter cage has an upper plate and a lower plate in opposed spaced relation. At least one filter element is mounted to the filter cage. The filter element includes a ring of filter media having a first axial end and a second axial end. A first end cap is mounted to the first axial end. The first end cap has an opening which is an air outlet of the at least one filter element. A second end cap is mounted to the second axial end. The second end cap has an opening which is a drain of the at least one filter element. The at least one filter element is interposed between the upper plate and lower plate such that the first annular sealing flange axially seals against the upper plate and such that the second annular sealing flange seals against the lower plate.

In an embodiment, the upper plate has at least one aperture, and wherein the lower plate has at least one aperture. The opening of the first end cap aligns with the at least one aperture of the upper plate, and wherein opening of the second end cap aligns with the at least one aperture of the lower plate.

In an embodiment, the system also includes a liquid collection region formed adjacent a first side of the lower plate. The liquid collection region arranged to collect liquid removed from the air stream. The system also includes a sump region formed adjacent a second side of the lower plate, the second side opposite the first side. The liquid collection region and sump region are in fluid communication with one another via at least one weep orifice. The liquid collection region is defined by a channel formed between the lower plate and the housing, and the sump region is defined by an interior space between the lower plate and the housing.

In yet another aspect, a filter element is provided. An embodiment of such a filter element includes a ring of filter media having a first axial end and a second axial end. A first end cap is mounted to the first axial end. The first end cap includes an axially facing outer surface with a first annular sealing flange axially protruding from the axially facing outer surface of the first end cap. A second end cap is mounted to the second axial end. The second end cap includes an axially facing outer surface with a second annular sealing flange axially protruding from the axially facing outer surface of the second end cap. The first and second end caps are identical.

In an embodiment, the element also includes a handle. The handle is attached at one end to the first end cap and attached at another end to the second end cap. The handle is formed from a flexible fabric material.

In an embodiment, the first and second end caps have a maximum outer diameter of about 7½ inches to about 11½ inches, and wherein the opening of each of the first and second end caps has a maximum diameter of about 5½ inches to about 9/12 inches. The filter media has an axial length of about 14 inches to about 21 inches taken between axially facing surfaces of the first and second end caps. The filter media has an outer diameter of about 7 inches to about 11 inches.

In an embodiment, the first and second annular sealing flanges are radially outside of an inner surface of the ring of filter media that defines an inner diameter of the ring of filter media. The first and second annular sealing flanges each have a cross section which tapers in an axial direction.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 10 is a partial view of the cross section of FIG. 9.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of an air filtration system (hereinafter system 20) and associated filter element 28 are illustrated. As will be explained in greater detail below, system 20 offers improvements in the art by providing a system which does not require camming or other mechanisms to form a seal with its associated filter elements. Further, air filtration system offers an optimized drainage arrangement for draining liquid which collects within system 20 during operation. In one embodiment and an exemplary application, the medium to be filtered is an air stream containing a fine dispersion or mist of a liquid, such as aerosols of a water-soluble cutting coolant solution or a hydrocarbon-based cutting oil.

Figure 1:
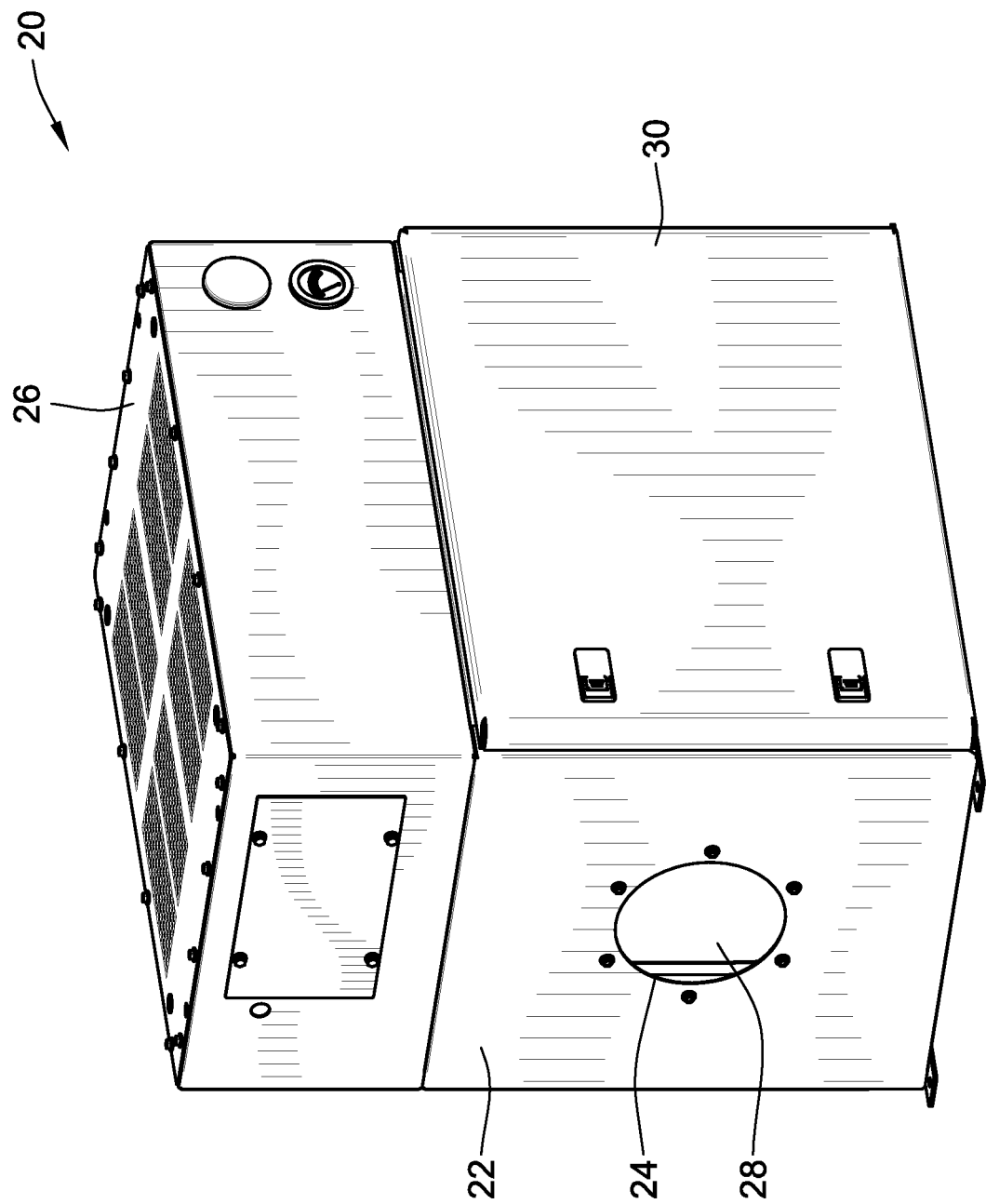
FIG. 1 is perspective view of an exemplary embodiment of a an air filtration system according to the teachings herein.

With particular reference to FIG. 1, the same illustrates an embodiment of system 20. System 20 includes a housing 22. The housing defines one or more inlets 24 as well as an outlet 26. Air entering the inlet or inlets 24 is filtered via one or more filter elements 28, and then exits system 20 via outlet 26. Housing 20 includes an access door 20 for accessing an interior space 32 (see FIG. 2) of housing 22. In the illustrated embodiment, a plurality of filter elements are mounted within interior space 32 such that air entering inlet 24 must pass through filter elements 28 prior to exiting through outlet 26. Housing 22 may be formed by one or more sheet metal panels.

Figure 2:
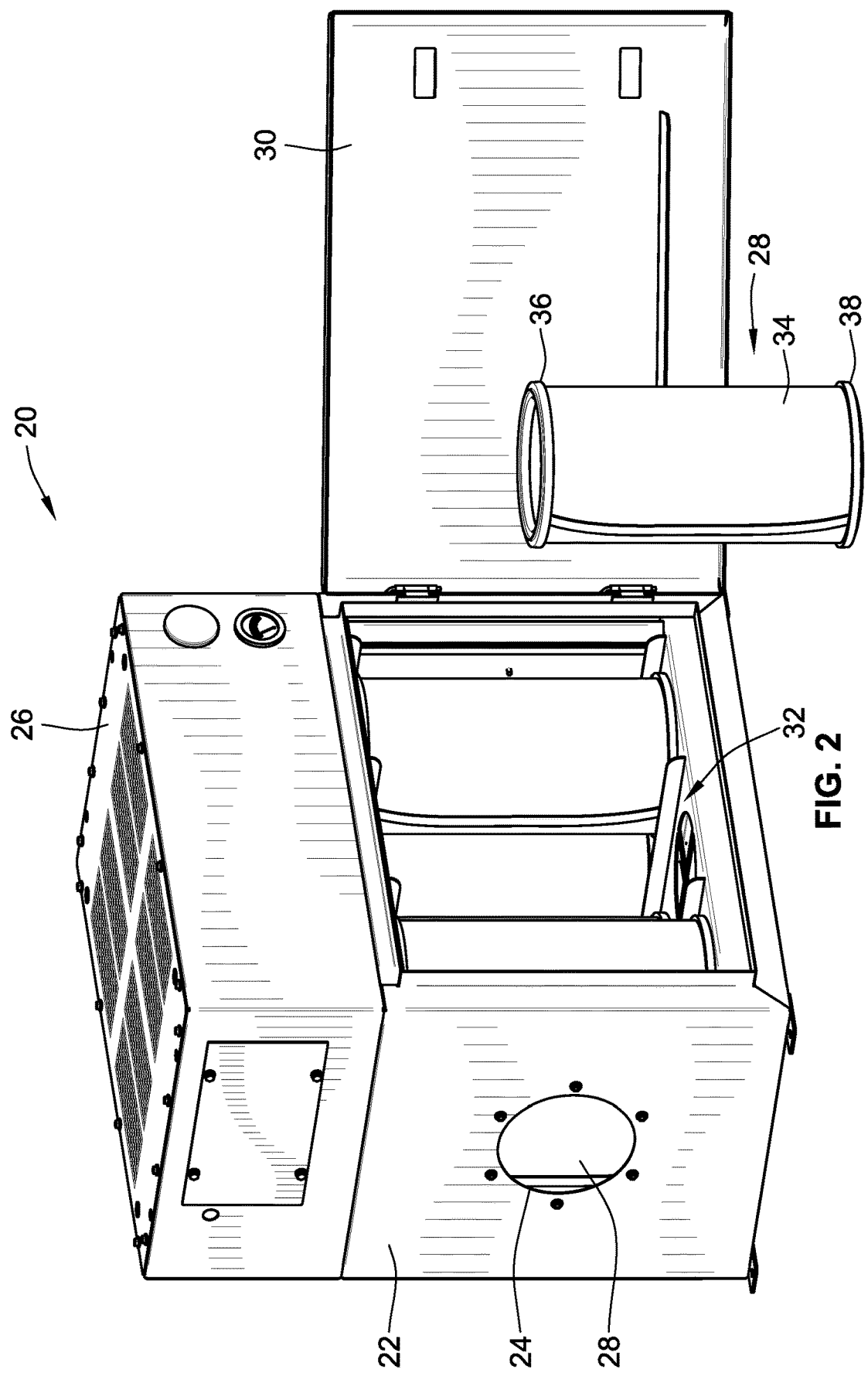
FIG. 2 is a perspective exploded view of the air filtration system of FIG. 1.

Turning now to FIG. 2, access door 30 has been removed to expose interior space 32. As may be readily seen in this view, each filter element 28 is installed be inserting the same through an opening normally covered by access door 30. Each element 28 is slid into place and seals against portions of a filter cage as described below. As may be seen in FIG. 2, there are no camming mechanism, ramps, or leverage mechanisms needed to install each filter element 28 in interior space 32.

Each filter element includes a ring of filter media 34 having first and second axial ends. A first end cap 36 is affixed to the first axial end, while a second end cap 38 is affixed to the second axial end. End caps 36, 38 are identical to one another in their structural configuration. As such, a description of one end cap should be taken to readily apply to the other. End caps 36, 38 are open end caps in that they each have a central opening. As explained below, the opening through first end cap 36 functions as an air outlet of the filter element, while the opening in second end cap 38 functions as a drain. It should be noted, however, that the terms "first" and "second" relative to end caps 36, 38 is used for descriptive purposes only. Either end cap can function as a drain, while the other end cap functions as an air outlet because end caps 36, 38 are identical. Put differently, filter element 28 is not restricted to a specific installation orientation, unlike prior designs.

The invention is not limited to any particular type of filtration media. As one example, depth filtration media may be utilized. In the particular embodiment, media 34 is a depth filtration type media and also a coalescing media in that it is designed such that liquid entrained in the air stream filtered by system 20 will coalesce on the surfaces of media 34. This liquid my include certain contaminants, so coalescing the same is desirable for filtration purposes. In some embodiments, media 34 is PEACH® (PECO® Engineered Applied Conical Helix) wrapped, laminated media such as described in U.S. Pat. No. 5,827,430, assigned to Perry Equipment Corporation of Mineral Wells, Tex., the entire disclosure of which is hereby incorporated by reference in its entirety. Additionally, it is envisioned that media 34 may be formed by the methods disclosed in U.S. Pat. No. 5,893,956, assigned to Perry Equipment Corporation of Mineral Wells, Tex., the entire disclosure of which is hereby incorporated by reference in its entirety.

Media 34 may be engineered to provide various filtration performance parameters. As one example of many, media 34 may present a droplet removal efficiency of greater than 75% for particles or droplets 0.1 micron or larger. In more preferred embodiment, media 34 has an overall particle or droplet removal efficiency of greater than 90% for particles or droplets 0.1 micron or larger. In most preferred embodiments, media 34 has an overall particle or droplet removal efficiency of greater than 95% for particles or droplets 0.1 micron or larger.

In other embodiments, media 34 will filter as air or gas flow containing an aerosol mist at an upstream concentration of up to 25 mg/m$^3$, 25-50 mg/m$^3$, or 50-100 mg/m$^3$ to a downstream concentration of less than 5 mg/m$^3$, as measured by a Welas 3000 optical particle sizer, with upstream and downstream samples taken at a laminar flow, isokinetic sample point.

End caps 36, 38 may be formed of any substance and by any method typically used for end cap construction. In the illustrated embodiment, end caps 36, 38 are formed from a urethane material. For example, the urethane may have a durometer 65 Shore A. Additionally, the urethane may be oil compatible. Still further, filter element 28 may also employ a handle as discussed below to aid in inserting and removing the same from interior space 32.

Figure 3:
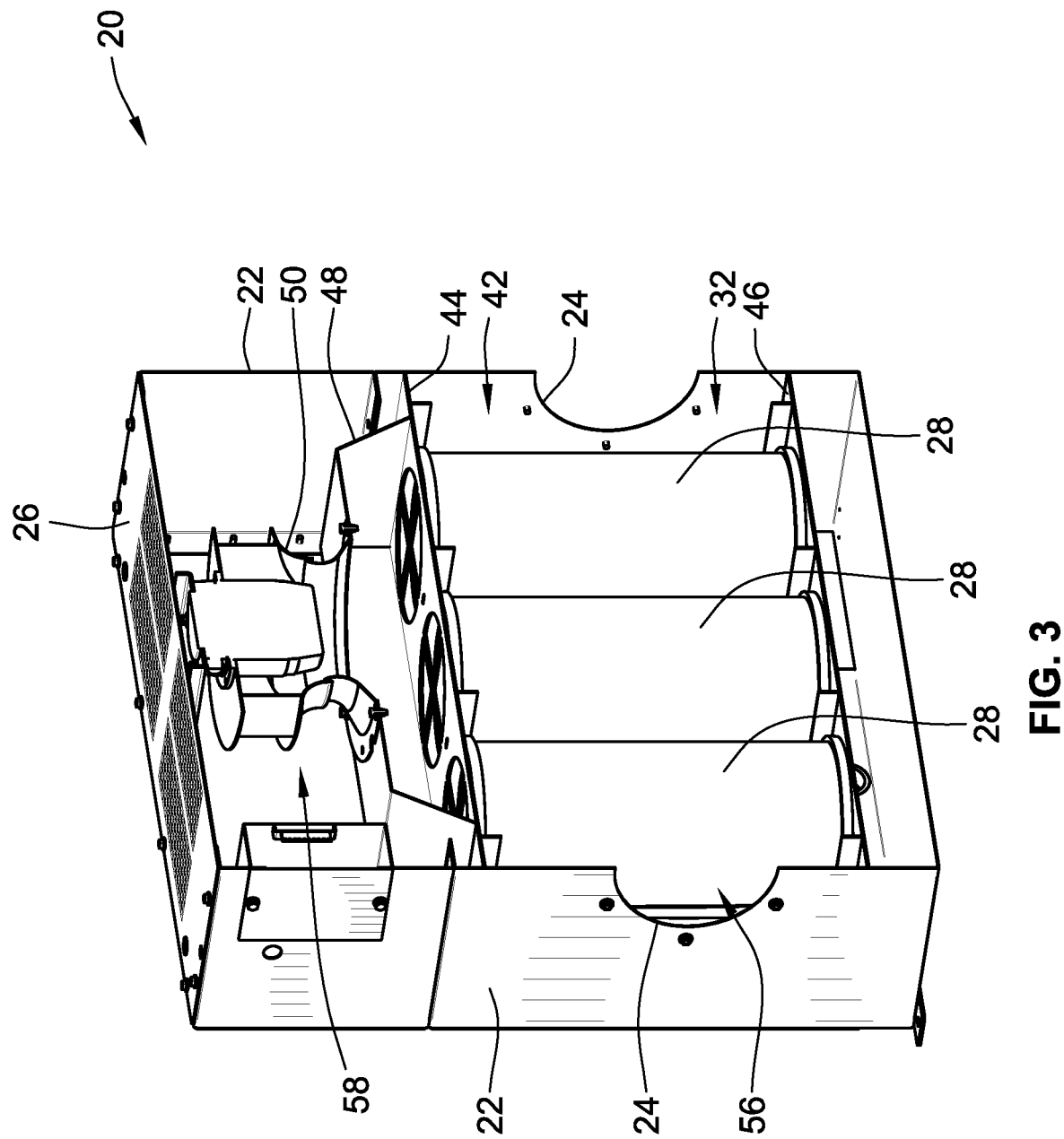
FIG. 3 is a perspective cross section of the air filtration system of FIG. 1.

With reference to FIG. 3, the same illustrates system 20 in cross section. As stated above, air enters interior space 32 via one or more inlets 24. The same is then filtered through one or more filter elements 28. Although the illustrated embodiment employs six filter elements 28, fewer or greater filter elements may be utilized 28. Dirty air within interior space 32, and more particularly and inlet region 56 thereof, then passes radially through filter media 34 of filter elements 28. This action cleans the air.

The air then travels through the opening in first end caps 36. Thereafter, the air exits filter elements 28 and is routed via a duct 48 toward outlet 26. The foregoing air flow is achieved under the force provided by a blower 50 mounted to duct 48 as shown. As will be readily understood, the sizing and type of blower utilized will depend on a number of factors, including desired air flow, as well as the overall size of system 20, in particular, the number of filter elements 28 employed.

As briefly introduced above, filter elements 28 are mounted to and sealingly engage a filter cage 42. Filter cage 42 includes an upper plate 44 and a lower plate 46. First end cap 36 axially seals against upper plate 44 (and more particularly a seal surface 62 thereof), while second end cap 38 axially seals against lower plate 46 (and more particularly a seal surface 72 thereof). Each of these plates 44, 46 include apertures 64, 74 (see FIG. 4) which the openings in end caps 36, 38 align with. As can also be seen in FIG. 3, duct 48 mounts directly to upper plate 44. Further, various ones of the panels of housing 22 are affixed to filter cage 42. As such, filter cage 42, in addition to providing the necessary sealing surfaces and mounting configuration for filter elements 28, also provides structural support for system 20.

Figure 4:
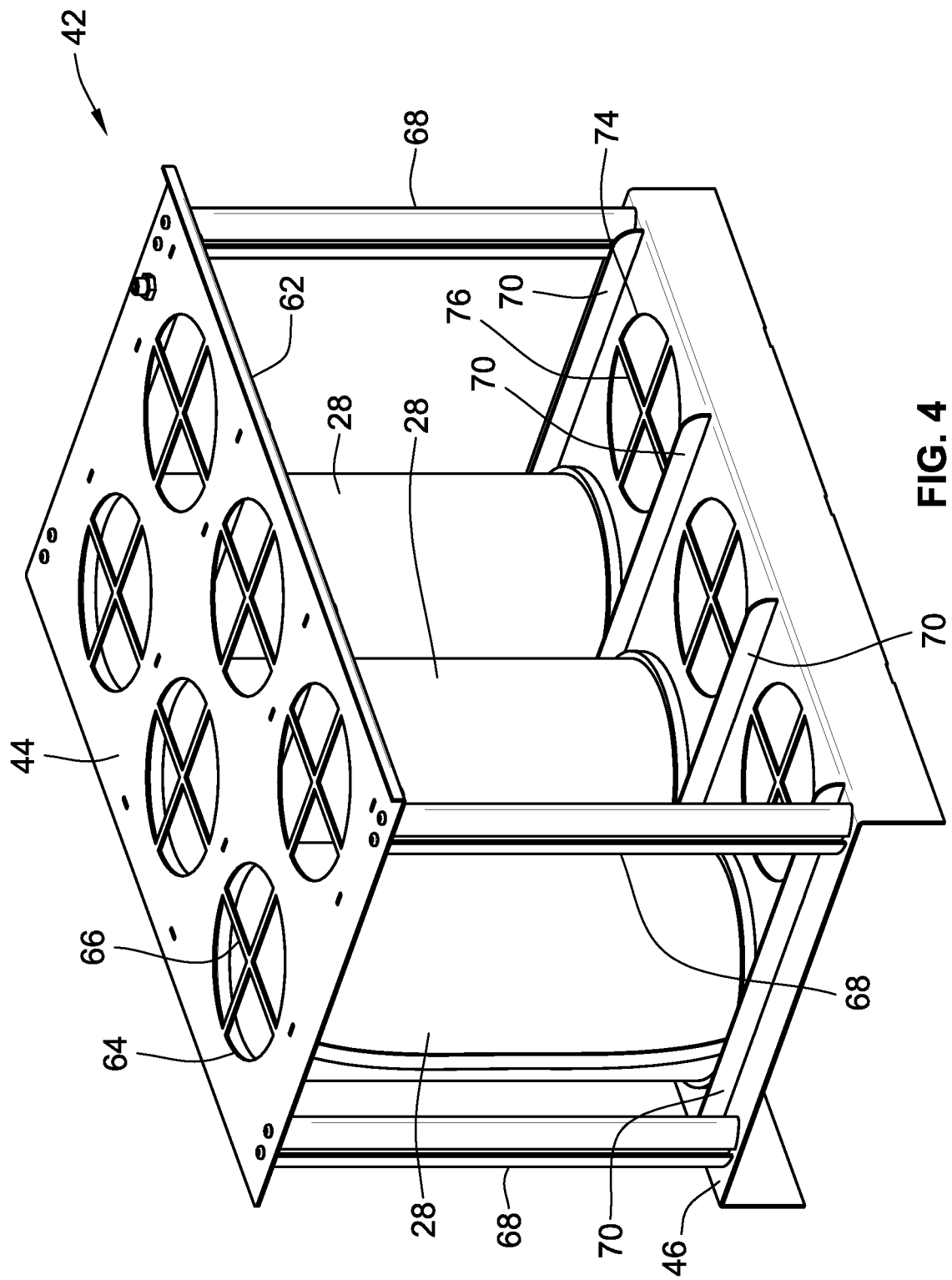
FIG. 4 is a perspective view of a filter cage of the air filtration system of FIG. 1 with a number of filter elements mounted thereto.
Figure 5:
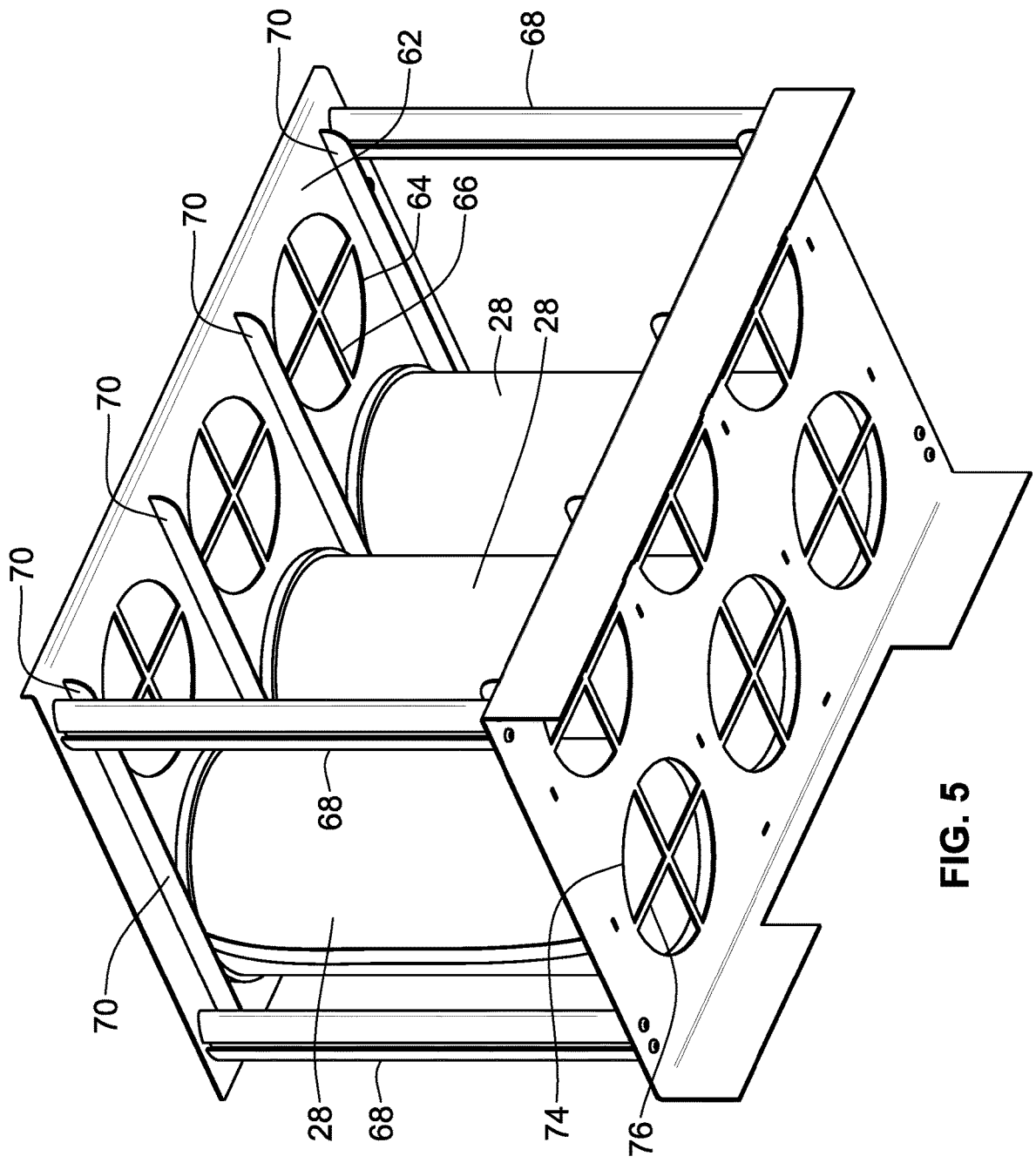
FIG. 5 is another perspective view of the filter cage of FIG. 4.

Turning now to FIGS. 4 and 5, filter cage 42 will be described in greater detail. As stated above, filter cage 42 includes upper and lower plates 44, 46. These plates 44, 46 are separated by vertical supports 6 as shown. The previously introduced apertures 64 of upper plate 44 have circular peripheries. Each aperture 64 may also include rib supports 66 as shown, to increase the structural integrity of upper plate 44. An identical approach is taken with lower plate 46, in that it also includes apertures 74 having circular peripheries. Each aperture 74 may also include ribs 76 to increase the structural integrity of lower plate 46. Further, both plates 44, 46 may include dividers 70 to aid in the proper alignment of filter elements 28.

Figure 6:
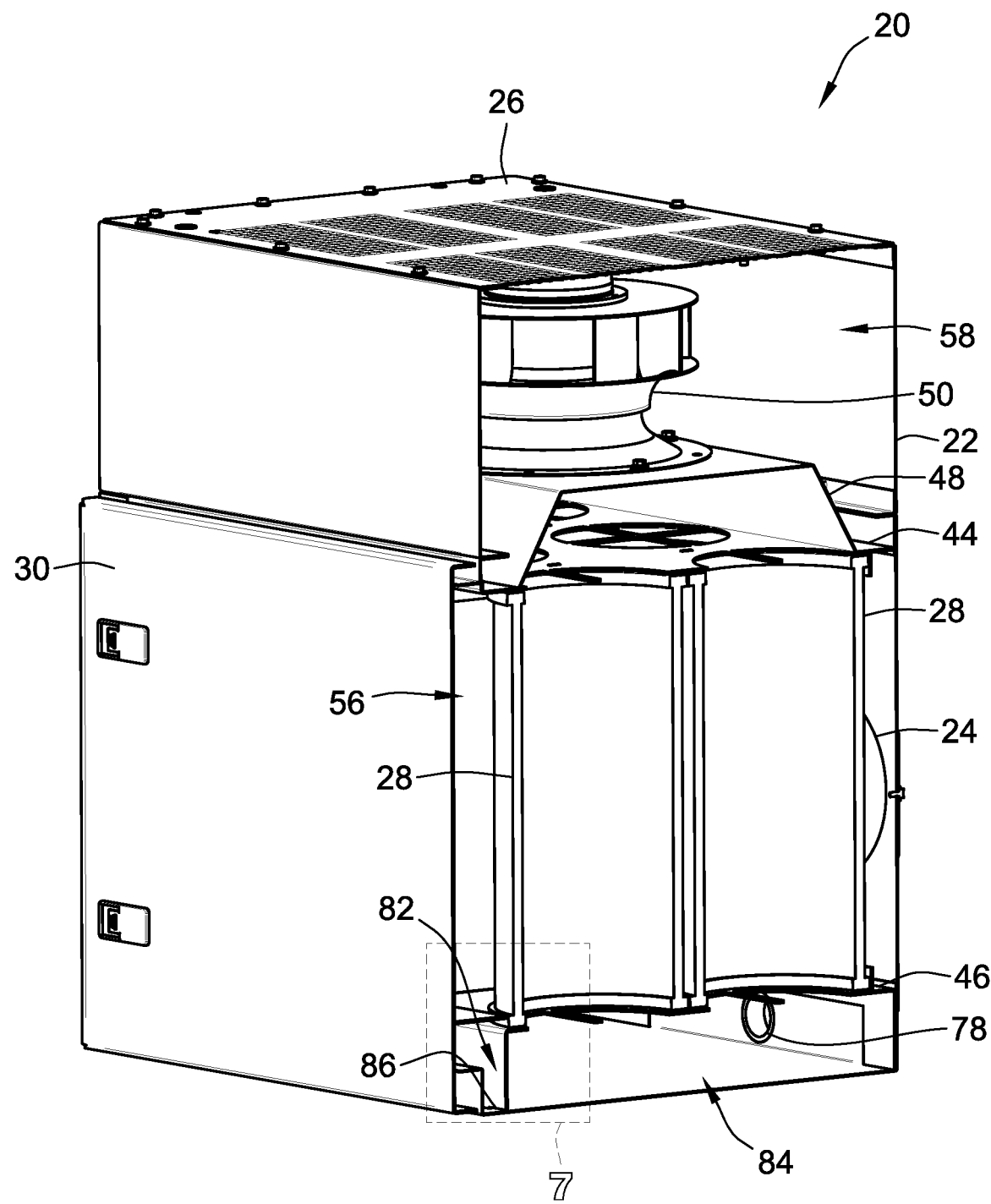
FIG. 6 is another perspective cross section of the air filtration system of FIG. 1, taken through a plane normal to the plane of the cross section shown in FIG. 3.

Turning now to FIG. 6, system 20 also employs a novel and inventive mechanism for collecting liquid removed from the air stream during filtration. Specifically, a liquid collection region 82 is formed within inlet region 56. This liquid collection region 82 is a channel which runs the length of lower plate 46, and is defined in party thereby. Indeed, as may be seen in FIG. 6, liquid collection region 82 is formed on one side of lower plate 46. This is the same side of lower plate 46 as that which sealing surface 72 is presented on. On the opposite side of lower plate 46, a sump region 84 is formed.

Liquid collection region 82 and sump region 84 are in communication with one another via one or more weep orifices 86. Liquid which accumulates within inlet region 56 collects in liquid collection region 82 and then enters sump region 84 via weep orifices 86. Liquid will continue to pass from collection region 82 into sump region 86 until the level of liquid within sump region 86 equalizes with the level of liquid in liquid collection region 82. This uniform level or "water line" of liquid will continue to rise until it encounters a main drain 78 in sump region 86 and then lowers as water is drained through main drain 78. In this regard, although not required, lower plate 46 may be slightly angled to encourage liquid flow into liquid collection region 82. Although sump region 84 is depicted as interior to the housing, it is also possible that sump region may 84 may be embodied directly as a drainage area or coolant recirculation system of a machining center. Further, main drain 78 may connect to such a drainage area or coolant recirculation system.

Figure 7:
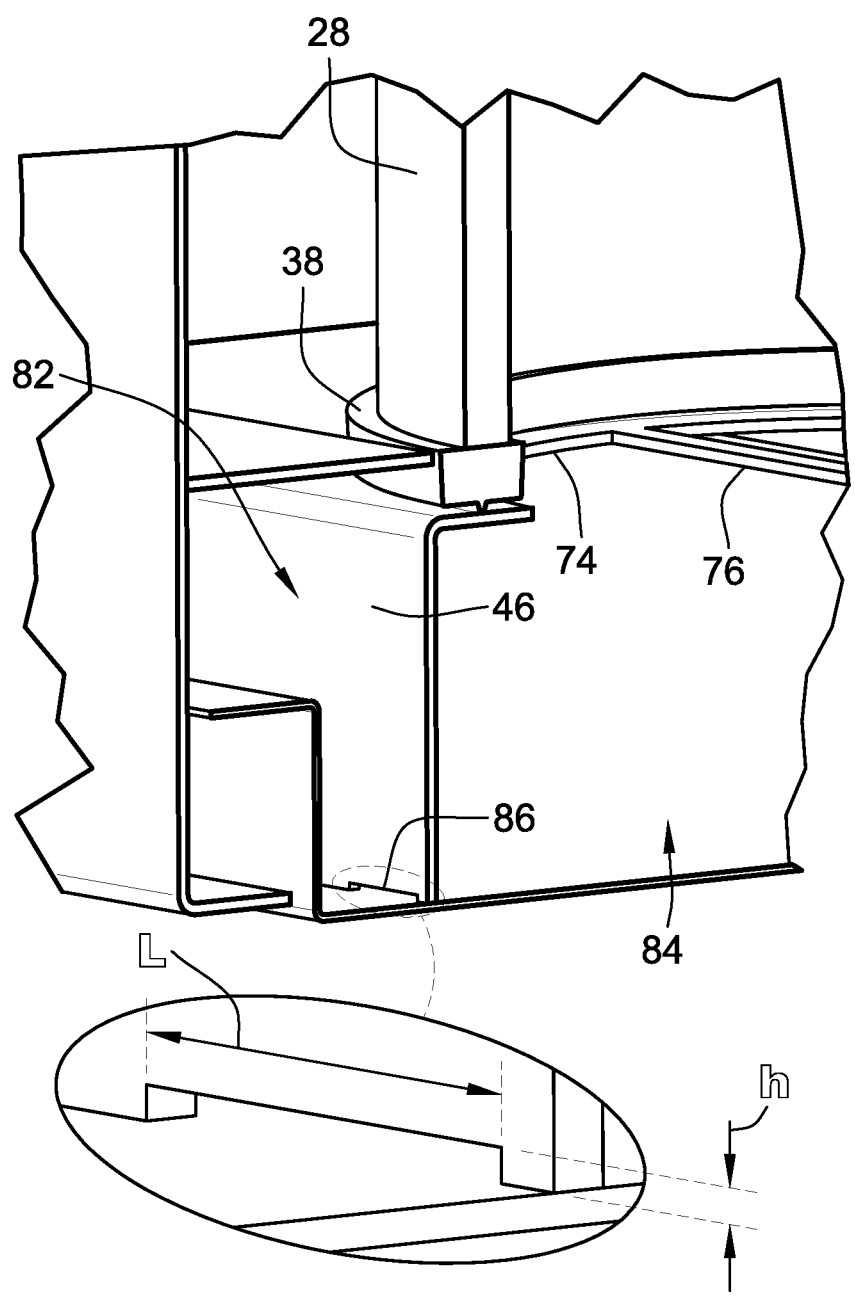
FIG. 7 is a partial perspective view of the cross section shown in FIG. 6.

Turning now to FIG. 7, each weep orifice 86 has a rectangular periphery with a length L and a vertical height h measured relative to the inner surface of the bottom of housing 22. With momentary reference back to FIG. 6, the height of main drain 78 relative to this same surface of housing 22 is such that the opening of main drain is entirely above the height h defined by weep orifices 86. As such, once the liquid level or line rises above the height h weep orifices 86 are effectively closed to air flow. In other words, once the liquid level is high enough, weep orifices 86 are blocked off such that dirty air cannot short circuit filter elements 26 by flowing through the same. There is thus a period after initial startup of system 20 where dirty air may pass through weep orifices 86. This only occurs, however, while the liquid level in liquid collection region 82 and sump region 84 is below that of height h of weep orifices 86.

Once the liquid level is above height h, it will only lower after a continued rise in the liquid level to reach main drain 78. As such, after initial startup, system 20 advantageously allows for the drainage of coalesced liquid from inlet region 56 via liquid collection region 82. Further, liquid which coalesces on the inner diametrical surface of filter media 34 of each filter element 28 may run down filter media 34 and exit each filter element 28 through the opening in second end cap 38.

As such, while the opening in first end cap 36 functions as an air outlet, the opening in second end cap 38 functions as a drain. This coalesced liquid exiting through the aforementioned drain is then collected in sump region 84, to ultimately be removed via main drain 78 as described above. From the above, it may be seen that coalesced liquid on the inlet side of filter elements 28 as well as the outlet side thereof is ultimately collected within sump region 84 for drainage via main drain 78.

Figure 8:
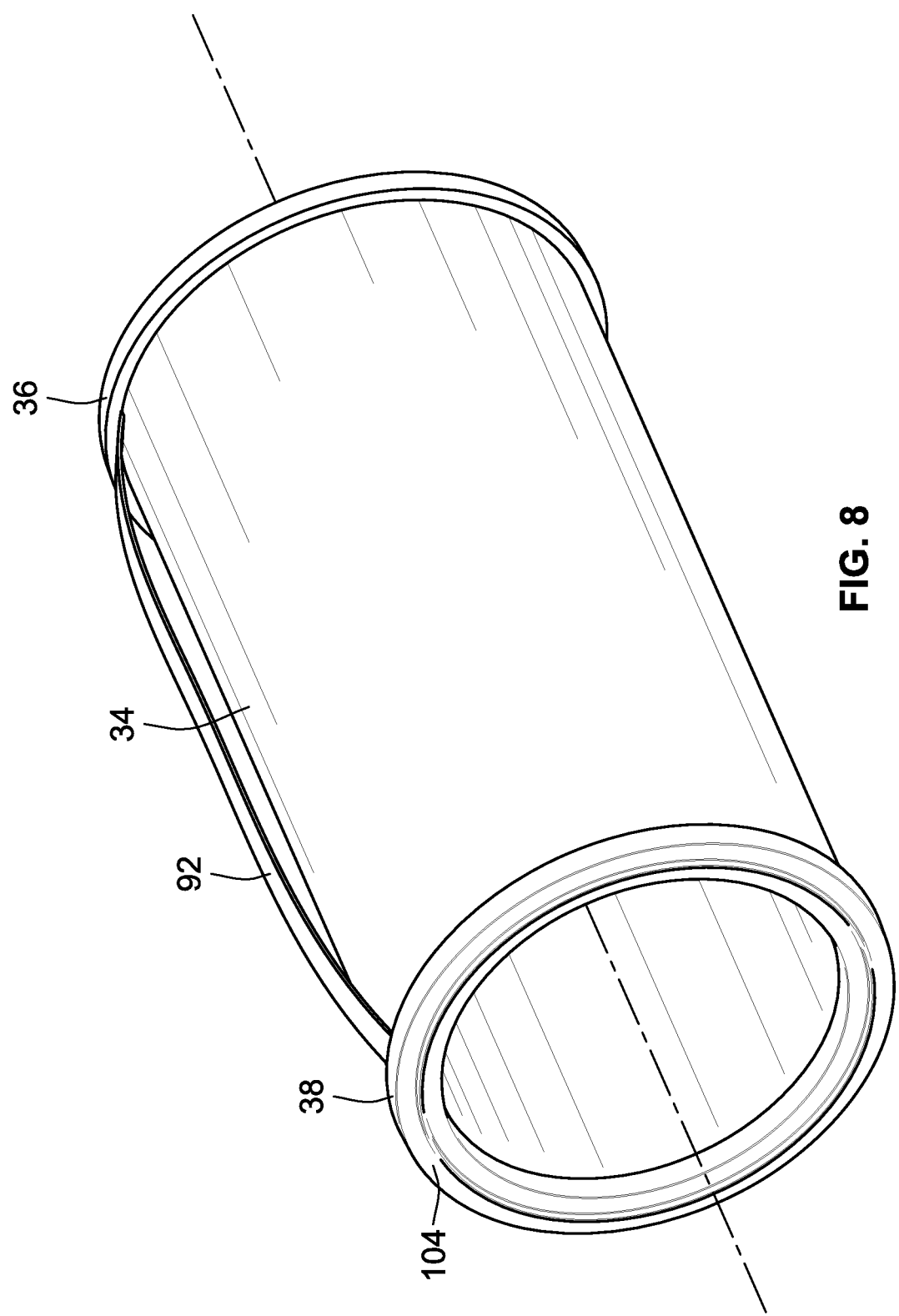
FIG. 8 is a perspective view of an exemplary embodiment of a filter element associated with the air filtration system shown in FIG. 1.
Figure 9:
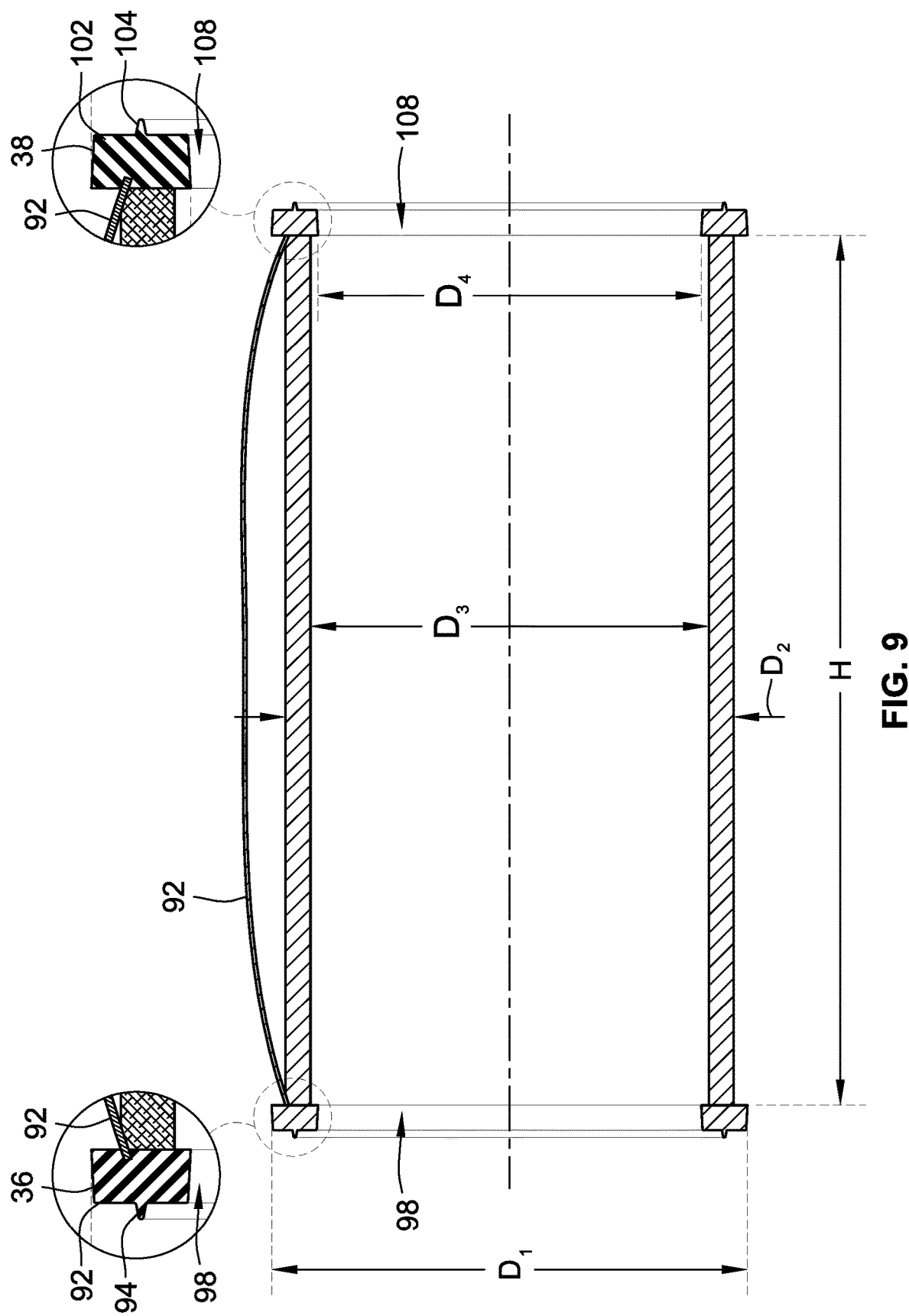
FIG. 9 is a cross section of the filter element of FIG. 8.

Turning now to FIGS. 8-10, filter element 28 will be described in greater detail. With reference first to FIG. 8, the same illustrates an exemplary representation of filter element 28. As discussed above, filter element 28 includes a ring of filter media 34 with end caps 36, 36 positioned, respectively at the axial ends of this ring of filter media 34. Both end caps are open such that a continuous passageway extends through filter element 28. Additionally, a handle 92 may be affixed to end caps 36, 38 to aid in the handling of filter element 28, in particular the installation and removal thereof from system 20. This handle 92 may be a rigid member formed for example from plastic. Alternatively, handle 92 may be formed of a flexible material such as a fabric. In either case, the ends of handle 92 may be affixed to the remainder of filter element 28 using the end cap 36, 28 material.

Turning now to FIG. 9, in the illustrated embodiment, each end cap 36, 38 may have for example a maximum outer diameter $D_1$ of about 7½ inches to about 11½ inches, filter media 34 may have an outer diameter $D_2$ of about 7 inches to about 11 inches, filter media 34 may have an inner diameter $D_3$ of about 6 inches to about 10 inches, the above described openings 98, 108 through end caps 36, 38 may have a maximum diameter $D_4$ of about 5½ inches to about 9½ inches, and filter media 34 may have a height H taken between the axially facing surfaces of end caps 34, 36 of about 14 inches to about 21 inches. These dimensions, however, are only exemplary and the invention is not limited to the same. Further, the use of the term "about" with regard to the foregoing dimensional ranges is used to allow for some deviation based on manufacturing tolerances known to one of ordinary skill in the art of filter element manufacture.

Turning now to FIGS. 9 and 10, each end cap 36, 38 includes an annular sealing flange 94, 104 which extends, respectively, from an outer axial facing surface 96, 106 of each end cap. As described herein, these annular sealing flanges 94, 104 are responsible for forming a seal with their respective seal surface 62, 72. As can be seen in FIG. 10, this sealing flange is radially exterior of the inner diameter of filter media 34. This annular sealing flange 94, 104 may have a conically tapered cross section as shown, although this is not a requirement of the invention. Further, each sealing flange 94, 104 may be formed integrally or separately from the remainder of its associated end cap, and also may be formed from a similar or dissimilar material from its associated end cap. As such, the phrase that the end cap "includes" an annular sealing flange should be taken to mean any of the above constructions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An industrial air filtration system for filtering an air stream, the system comprising:
    a housing having at least one inlet and at least one outlet with a flowpath extending between the at least one inlet and the at least one outlet;
    a filter cage mounted within the housing, the filter cage having an upper plate and a lower plate in opposed spaced relation;
    at least one filter element mounted to the filter cage;
    a liquid collection region formed adjacent a first side of the lower plate, the liquid collection region arranged to collect liquid removed from the air stream,
    a sump region formed adjacent a second side of the lower plate, the second side opposite the first side; wherein the liquid collection region and sump region are in fluid communication with one another via at least one weep orifice; and
    wherein the liquid collection region is defined by a channel formed between the lower plate and the housing.

2. The system of claim 1, wherein a plurality of vertical supports are connected to and separate the upper and lower plates.

3. The system of claim 1, wherein each of the upper and lower plates include at least one aperture.

4. The system of claim 3, wherein the at least one filter element includes a ring of filter media having a first axial end and a second axial end, wherein a first end cap is affixed to the first axial end, and wherein a second end cap is affixed to the second axial end.

5. The system of claim 4, wherein the first end cap has an opening which aligns with the at least one aperture of the upper plate, and wherein the second end cap has an opening which aligns with the at least one aperture of the lower plate.

6. The system of claim 5, wherein the opening of the first end cap is an air outlet of the at least one filter element, and wherein the opening of the second end cap is a drain of the at least one filter element.

7. The system of claim 1, wherein the channel has a length which is at least half of a length of the lower plate.

8. The system of claim 7, wherein the at least one weep orifice includes a plurality of weep orifices intermittently spaced along the length of the channel, wherein each weep orifice has a rectangular periphery.

9. The system of claim 1, wherein the sump region is defined by an interior space between the lower plate and the housing.

10. The system of claim 9, further comprising a drain port in communication with the sump region.

11. The system of claim 10, wherein the drain port is situated above a maximum height of the at least one weep orifice.

12. An industrial air filtration system for filtering an air stream, comprising:
a housing having at least one inlet and at least one outlet with a flowpath extending between the at least one inlet and the at least one outlet;
a filter cage mounted within the housing, the filter cage having an upper plate and a lower plate in opposed spaced relation;
at least one filter element mounted to the filter cage, the filter element comprising:
a ring of filter media having a first axial end and a second axial end;
a first end cap mounted to the first axial end, the first end cap having an opening which is an air outlet of the at least one filter element;
a second end cap mounted to the second axial end, the second end cap having an opening which is a drain of the of the at least one filter element;
the at least one filter element interposed between the upper plate and lower plate such that a first annular sealing flange axially seals against the upper plate and such that a second annular sealing flange seals against the lower plate; and
further comprising a liquid collection region formed adjacent a first side of the lower plate, the liquid collection region arranged to collect liquid removed from the air stream, and a sump region formed adjacent a second side of the lower plate, the second side opposite the first side; wherein the liquid collection region and sump region are in fluid communication with one another via at least one weep orifice; and
wherein the liquid collection region is defined by a channel formed between the lower plate and the housing.

13. The system of claim 12, wherein the upper plate has at least one aperture, and wherein the lower plate has at least one aperture.

14. The system of claim 13, wherein the opening of the first end cap aligns with the at least one aperture of the upper plate, and wherein opening of the second end cap aligns with the at least one aperture of the lower plate.

15. The system of claim 12, wherein the sump region is defined by an interior space between the lower plate and the housing.

* * * * *